(12) United States Patent
Takahashi et al.

(10) Patent No.: US 9,228,608 B2
(45) Date of Patent: Jan. 5, 2016

(54) MOTION GUIDE APPARATUS

(75) Inventors: Toru Takahashi, Shinagawa-ku (JP); Yoshihiro Hamada, Shinagawa-ku (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/241,150

(22) PCT Filed: Sep. 6, 2012

(86) PCT No.: PCT/JP2012/072693
§ 371 (c)(1),
(2), (4) Date: Feb. 26, 2014

(87) PCT Pub. No.: WO2013/035769
PCT Pub. Date: Mar. 14, 2013

(65) Prior Publication Data
US 2014/0363110 A1 Dec. 11, 2014

(30) Foreign Application Priority Data
Sep. 9, 2011 (JP) ................... 2011-197257

(51) Int. Cl.
*F16C 29/04* (2006.01)
*F16C 33/36* (2006.01)
(Continued)

(52) U.S. Cl.
CPC ............... *F16C 29/005* (2013.01); *F16C 29/04* (2013.01); *F16C 29/065* (2013.01); *F16C 29/0633* (2013.01); *F16C 33/36* (2013.01); *F16C 33/363* (2013.01)

(58) Field of Classification Search
CPC .... F16C 29/04; F16C 29/005; F16C 29/0633; F16C 29/065; F16C 33/36

USPC ............ 384/36, 43–45, 50, 548, 565, 568, 55
See application file for complete search history.

(56) References Cited

U.S. PATENT DOCUMENTS 3,606,499 A * 9/1971 Ganser et al. ................... 384/44
4,293,166 A * 10/1981 Ernst et al. ...................... 384/45
(Continued)

FOREIGN PATENT DOCUMENTS

| JP | 11-201162 A | 7/1999 |
| JP | 2000-205255 A | 7/2000 |

(Continued)

OTHER PUBLICATIONS

International Search Report of PCT/JP2012/072693 dated Dec. 11, 2012.

*Primary Examiner* — Marcus Charles
(74) *Attorney, Agent, or Firm* — Sughrue Mion, PLLC

(57) ABSTRACT

Provided is a motion guide apparatus including a track member with a rolling-element rolling surface and a moving member with a load rolling-element rolling surface, the moving member being movably assembled to the track member via a rolling element provided between the moving member and the track member, wherein: the cross-sectional shape of each of the rolling-element rolling and the load rolling-element rolling surfaces has a circular arc shape projecting in the direction that the rolling-element rolling surface and the load rolling-element rolling surface face each other; the rolling element has a drum-shaped cross-section with a diameter gradually reduced from both ends of the rolling element so as to correspond to the cross-sectional shape of the rolling-element rolling surface and the load rolling-element rolling surface; and the rolling-element rolling surface and the load rolling-element rolling surface configure an angular contact structure via the rolling element.

7 Claims, 7 Drawing Sheets

(51) Int. Cl.
*F16C 29/06* (2006.01)
*F16C 29/00* (2006.01)

(56) References Cited

U.S. PATENT DOCUMENTS 4,463,992 A * 8/1984 Heine .............................. 384/44
6,312,158 B1 11/2001 Teramachi et al.
2005/0105834 A1 * 5/2005 Menges et al. .................. 384/44

FOREIGN PATENT DOCUMENTS

| JP | 2002-250340 A | 9/2002 |
| JP | 2002-266860 A | 9/2002 |
| JP | 3493517 B2 | 2/2004 |
| JP | 2011-112069 A | 6/2011 |

* cited by examiner

MOTION GUIDE APPARATUS

CROSS REFERENCE TO RELATED APPLICATIONS

This is a National Stage of International Application No. PCT/JP2012/072693 filed Sep. 6, 2012, claiming priority based on Japanese Patent Application No. 2011-197257 filed Sep. 9, 2011, the contents of all of which are incorporated herein by reference in their entirety.

TECHNICAL FIELD

The present invention relates to a motion guide apparatus.

BACKGROUND ART

Conventionally, a motion guide apparatus is known which comprises a track member having a rolling-element rolling surface formed thereon in the longitudinal direction thereof, a moving member having a load rolling-element rolling surface formed thereon so as to face the rolling-element rolling surface, the moving member being movably assembled to the track member, and a plurality of rolling elements, such as balls or cylindrical rollers, rolling between the rolling-element rolling surface and the load rolling-element rolling surface.

In the motion guide apparatus, when the moving member receives a load, the moving member is displaced relatively to the track member. In the case where a ball is used as the rolling element, when the moving member is displaced relatively to the track member, the contact point is changed, so as to change the contact angle. However, in a contact structure such as, for example, a circular arc contact structure, using a moving member and balls, the contact angle is not changed, and hence smooth rolling can be realized. On the other hand, in the case where a cylindrical roller is used, a rolling-element rolling surface and a load rolling-element rolling surface can be brought into line contact with the roller, and hence the rigidity can be improved.

CITATION LIST

Patent Literature

[Patent Literature 1] Japanese Patent No. 3493517

DISCLOSURE OF THE INVENTION

Problems to be Solved by the Invention

However, in the motion guide apparatus using a cylindrical roller, when the moving member receives, for example, an excessive moment load, the position of the moving member relative to the roller is changed, and thereby the rolling-element rolling surface and the roller become non-parallel with each other, so that a component force is generated in the shaft direction of the roller. Thereby, the roller is forced into uneven contact with the moving member, resulting in a possibility that the contact structure between the roller and the moving member is not maintained and thereby the function of the motion guide apparatus cannot be fully exhibited. That is, it is known that a cylindrical roller is poor in self-adjusting capability. Further, since, when a component force is generated in the shaft direction of the roller, the roller is moved in the shaft direction, positioning sections, such as walls or flanges, need to be formed at roller-shaft-direction end portions of the moving member. The positioning sections, such as walls or flanges, need to be manufactured with extremely high dimensional accuracy. As a result, when a cylindrical roller is applied as a rolling element, there is a case where it is not only difficult to reduce manufacturing cost, but also smooth rolling of the roller is hindered.

The present invention has been made in order to solve the above described problems. An object of the present invention is to provide a motion guide apparatus which enables rollers to be smoothly endlessly rolled without using positioning devices, such as walls or flanges, and which can reduce manufacturing cost.

Means for Solving the Problems

According to the present invention, there is provided a motion guide apparatus comprising: a track member with a rolling-element rolling surface formed thereon along the longitudinal direction of the track member; and a moving member on which a load rolling-element rolling surface facing the rolling-element rolling surface is formed and which is movably assembled to the track member via a rolling element provided between the moving member and the track member, the motion guide apparatus being featured in that the cross-sectional shape of each of the rolling-element rolling surface and the load rolling-element rolling surface is formed into a circular arc shape projecting in the direction that the rolling-element rolling surface and the load rolling-element rolling surface face each other, in that the rolling element is formed to have a cross-sectional shape whose diameter is gradually reduced from both ends of the rolling element along the shaft direction of the rolling element so as to correspond to the cross-sectional shape of the rolling-element rolling surface and the load rolling-element rolling surface, and in that the rolling-element rolling surface and the load rolling-element rolling surface configure an angular contact structure via the rolling element.

Effects of the Invention

With the present invention, it is possible to smoothly endlessly circulate the drum-shaped rollers without using positioning devices, and it is also possible to provide a motion guide apparatus whose manufacturing cost is reduced.

MODE FOR CARRYING OUT THE INVENTION

First Embodiment

In the following, embodiments of a motion guide apparatus according to the present invention will be described with reference to the accompanying drawings. It should be noted that the following embodiments are not restrictive as to the scope of the present invention as recited in the claims, and all combinations of the features described in the embodiments are not always essential for the solution according to the present invention.

Figure 1:
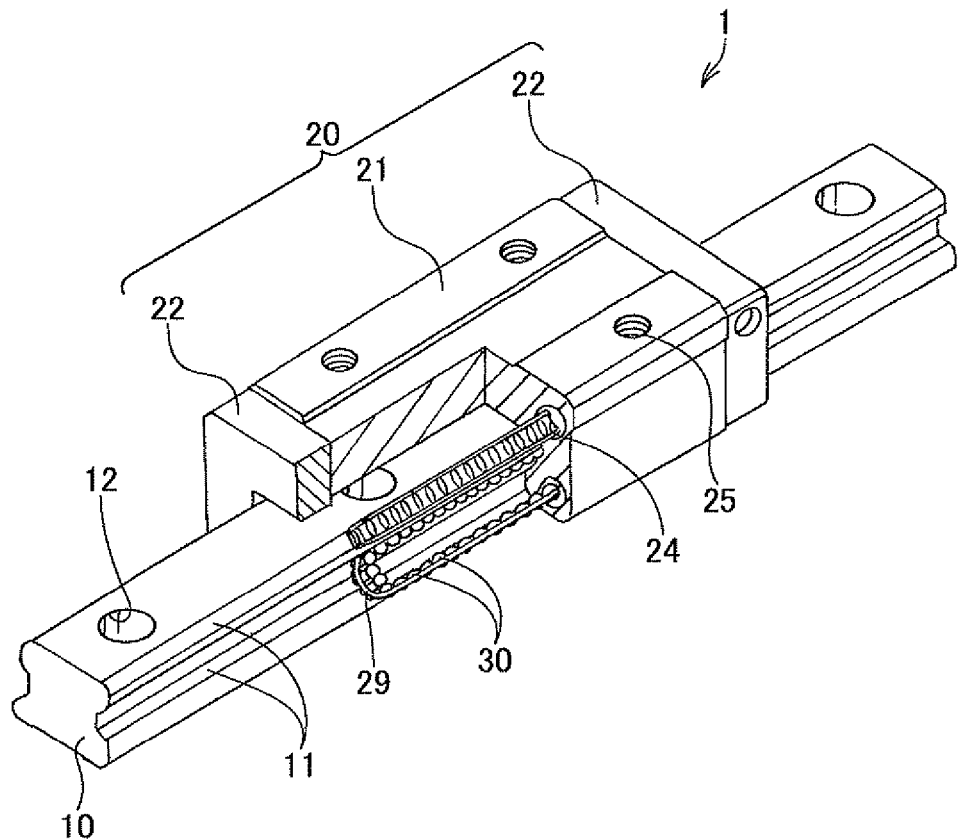
FIG. 1 is a perspective view showing a motion guide apparatus according to a first embodiment of the present invention.
Figure 2:
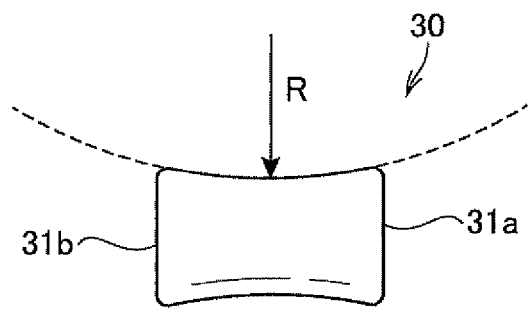
FIG. 2 is a front view showing a drum-shaped roller used for the motion guide apparatus according to the first embodiment of the present invention.
Figure 3:
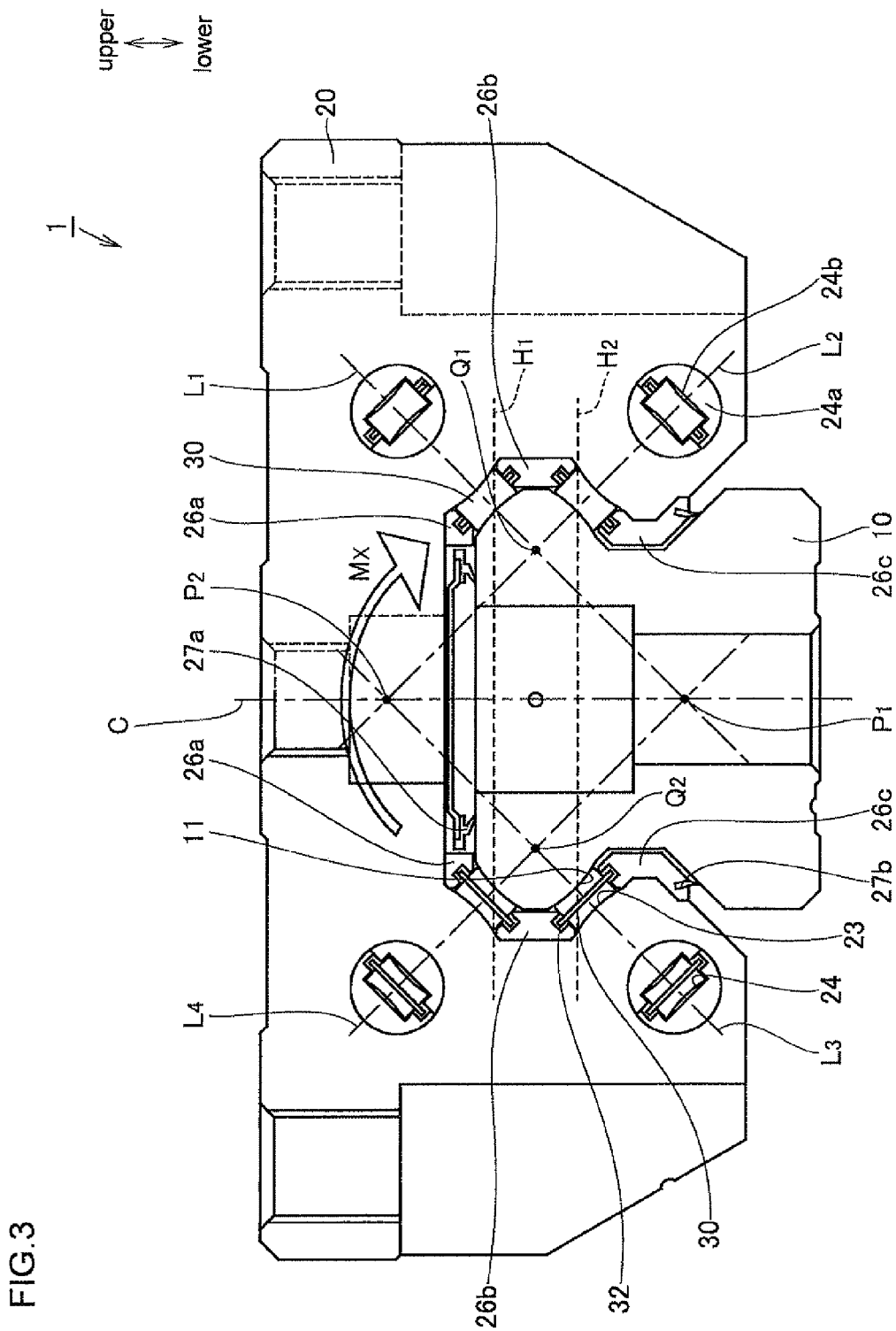
FIG. 3 is a cross-sectional view for explaining a structure of the motion guide apparatus according to the first embodiment of the present invention.
Figure 4:
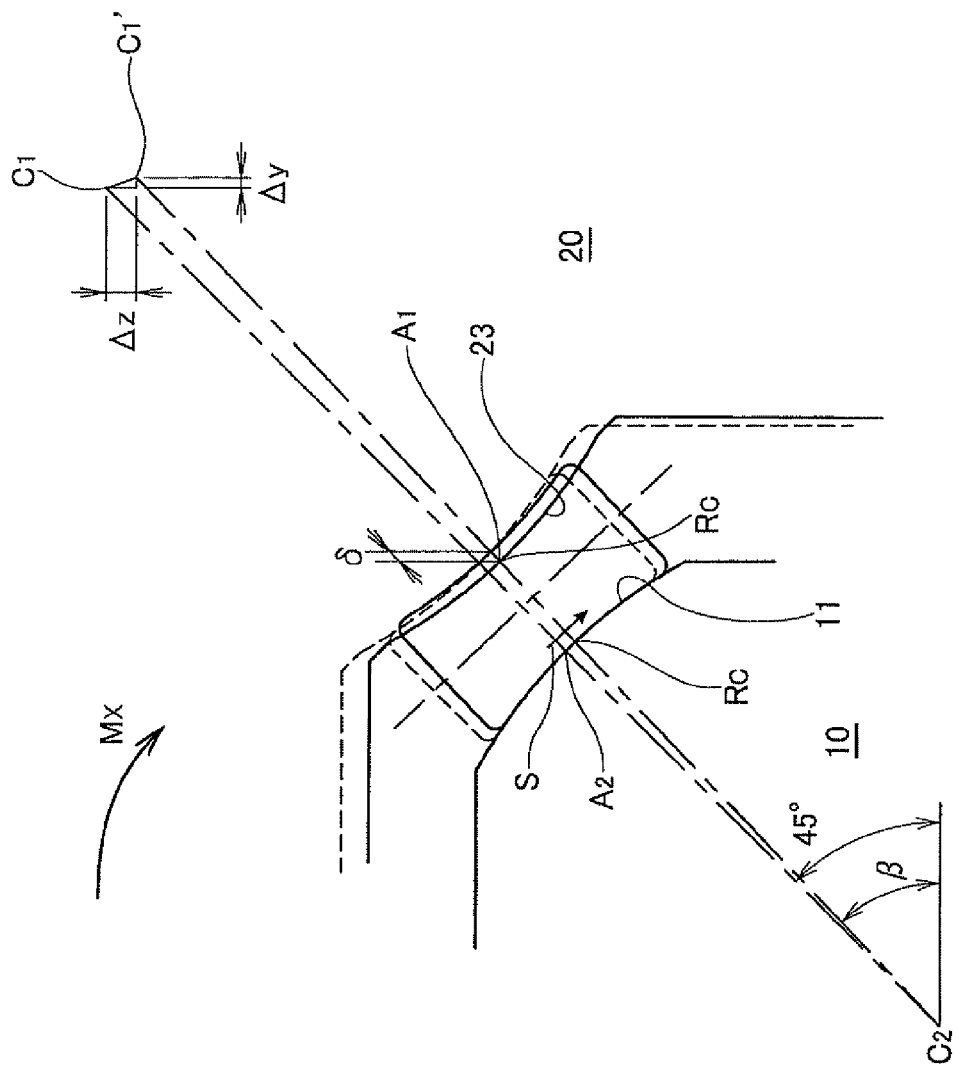
FIG. 4 is a conceptual diagram for explaining the operation of each member in the motion guide apparatus according to the first embodiment of the present invention.

FIG. 1 is a perspective view showing a motion guide apparatus according to a first embodiment of the present invention. FIG. 2 is a front view showing a drum-shaped roller used for the motion guide apparatus according to the first embodiment of the present invention. FIG. 3 is a cross-sectional view for explaining a structure of the motion guide apparatus according to the first embodiment of the present invention. FIG. 4 is a conceptual diagram for explaining the operation of each member in the motion guide apparatus according to the first embodiment of the present invention.

Figure 5:
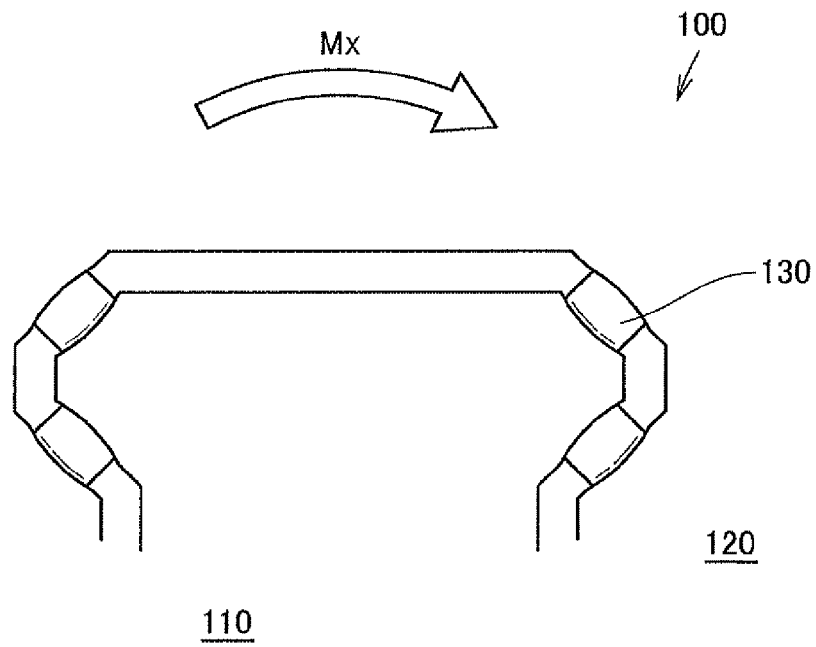
FIG. 5 is an illustration for explaining a motion guide apparatus which uses a barrel-shaped roller, and which is a comparison example of the present invention.
Figure 6:
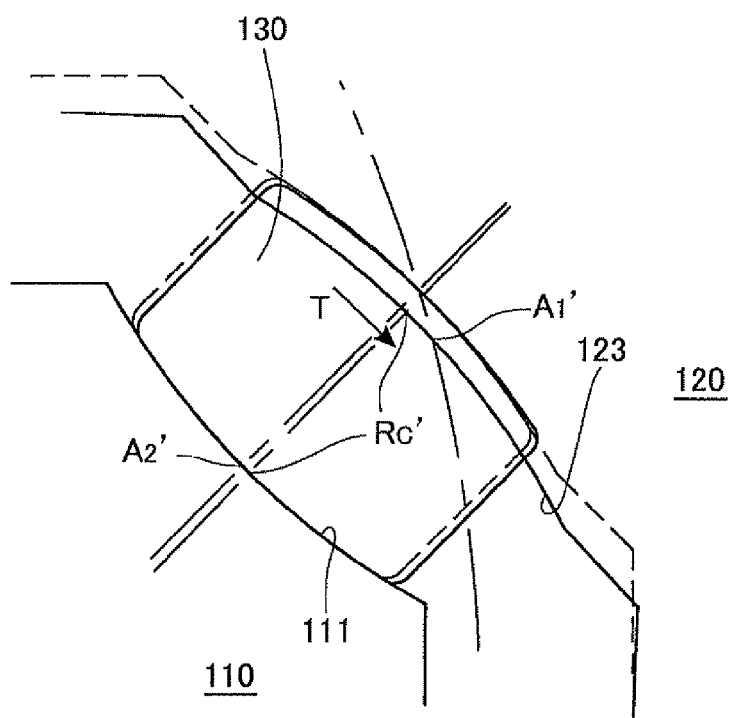
FIG. 6 is a conceptual diagram for explaining the operation of the motion guide apparatus which uses the barrel-shaped roller, and which is the comparison example of the present invention.
Figure 7:
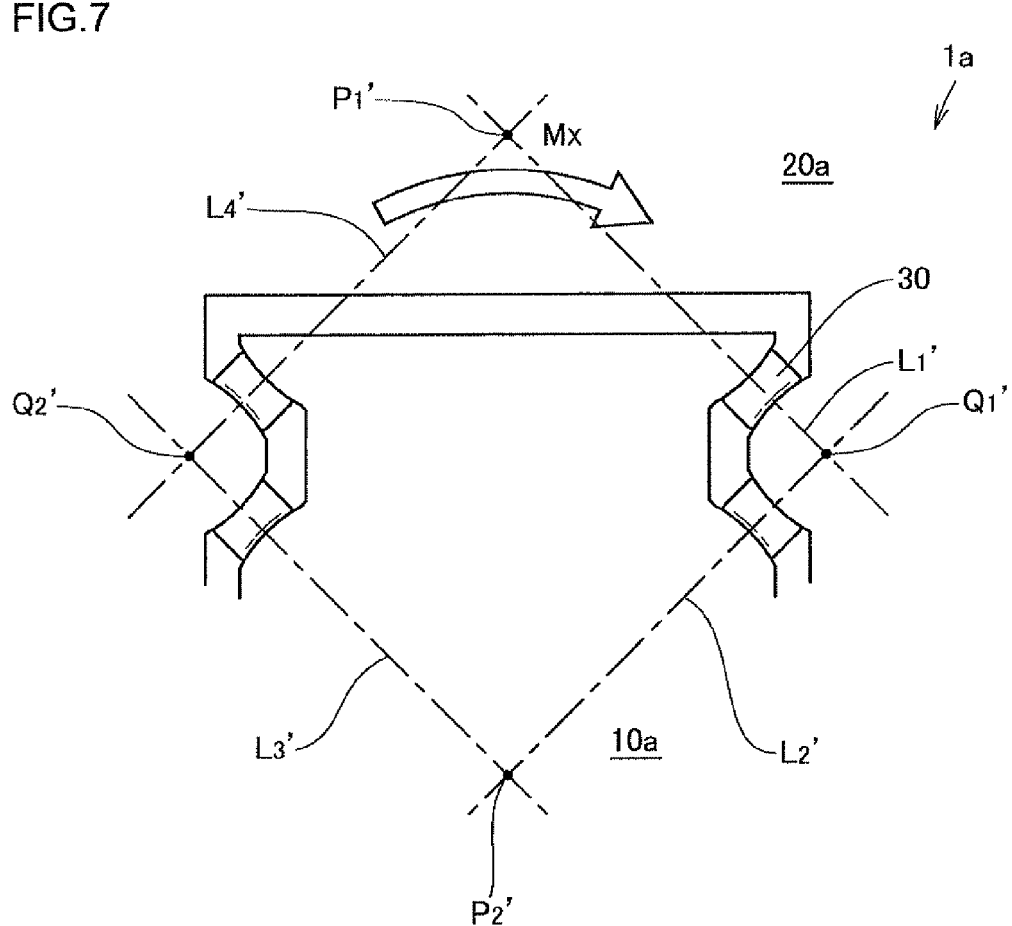
FIG. 7 is an illustration for explaining a modification of the motion guide apparatus according to the first embodiment of the present invention.

FIG. 5 is an illustration for explaining a motion guide apparatus which uses a barrel-shaped roller, and which is a comparison example of the present invention. FIG. 6 is a conceptual diagram for explaining the operation of the motion guide apparatus which uses the barrel-shaped roller, and which is the comparison example of the present invention. FIG. 7 is an illustration for explaining a modification of the motion guide apparatus according to the first embodiment of the present invention. It should be noted that, in the following description, as shown in FIG. 3, the vertical direction in FIG. 3 is defined as the vertical direction in the drawings.

As shown in FIG. 1, a motion guide apparatus 1 according to a present embodiment comprises: a track member 10, on the outer surface of which a plurality of rolling-element rolling surfaces 11 are formed along the longitudinal direction of the track member 10; a moving member 20 on which a load rolling-element rolling surface 23 facing the rolling-element rolling surface 11 is formed and which is reciprocatably assembled to the track member 10; and a plurality of rolling elements (drum-shaped roller) 30 which roll between the rolling-element rolling surface 11 and the load rolling-element rolling surface 23. Further, as shown in FIG. 2, the rolling element 30 is formed into a drum shape whose diameter is gradually reduced from shaft-direction both ends 31a and 31b toward a central portion, and is formed, in cross-section, into a curved shape having a curvature radius R.

A plurality of bolt holes 12 are formed in the track member 10 from the upper surface toward the bottom surface of the track member 10. The motion guide apparatus 1 according to the present embodiment is fastened to a base by inserting bolts into the plurality of bolt holes 12 formed in the track member 10. Further, the track member 10 is a long member formed to have a substantially rectangular cross-sectional shape, and for example, a total of the four rolling-element rolling surfaces 11 are formed in such a manner that each of two pairs of the rolling-element rolling surfaces 11 are formed on the left and right sides so as to be separated from each other.

The moving member 20 is formed, in cross-section, into a substantially U-shape so as to straddle the upper surface of the track member 10, and is provided with side lids 22 respectively attached to the both end surfaces of a moving member main body 21 in the reciprocating direction of the moving member main body 21.

Each of the moving member main body 21 and the side lid 22 has a central portion facing the upper surface of the track member 10, and a pair of leg sections respectively facing the left and right side surfaces of the track member 10. On the moving member main body 21, for example, a total of the four load rolling-element rolling surfaces 23 extending in the longitudinal direction of the track member 10 are formed so as to respectively face the rolling-element rolling surfaces 11 of the track member 10.

Further, a total of four rolling-element return paths 24 extending in parallel with the load rolling-element rolling surface 23 are formed in the moving member main body 21.

Further, a pair of direction changing paths 29, each having a U-shape and connecting the load rolling-element rolling surface 23 to the rolling-element return path 24, are formed in the side lid 22. An infinite circulation path is formed by: a load rolling-element rolling path configured by the rolling-element rolling surface 11 and the load rolling-element rolling surface 23; a pair of the direction changing paths 29; and the rolling-element return path 24.

In the motion guide apparatus 1 according to the present embodiment, the drum-shaped rollers 30 are provided between the rolling-element rolling surface 11 and the load rolling-element rolling surface 23. Therefore, when the moving member 20 is moved in the longitudinal direction of the track member 10, the drum-shaped rollers 30 can be made to roll. The drum-shaped rollers 30, which are made to roll to reach one end of the load rolling-element rolling path, are scooped by a scooping section of the side lid 22, so as to be guided to one of the direction changing paths 29. The drum-shaped rollers 30 whose moving direction is changed by the direction changing path 29 are made to roll through the rolling-element return path 24, so as to be returned to the load rolling-element rolling path after passing through the other of the direction changing paths 29. An endless circulation is realized by making the drum-shaped rollers 30 roll in this way. It should be noted that, as shown in FIG. 3, the rolling-element return path 24 is formed to have a round cross-sectional shape, and a hollow circular pipe 24a is inserted into the rolling-element return path 24. The drum-shaped rollers are made to roll through the hollow portion of the pipe 24a, and a gap 24b is formed at a position facing the vicinity of the central portion of the rolling surface of the drum-shaped roller. The gap 24b can provide a function of holding lubricant, such as grease, to improve lubricity of the drum-shaped roller 30.

Further, the plurality of drum-shaped rollers 30 are held by a belt-shaped retainer configured by spacers arranged between the drum-shaped rollers 30, and belt-shaped connection belts 32 each connecting the spacers to each other via one of both end surfaces of each of the drum-shaped rollers 30. In this way, the drum-shaped rollers 30 are held in series by the connection belts 32, and hence it is possible to prevent the drum-shaped rollers 30 from colliding with each other.

Further, as shown in FIG. 3, the moving member 20 includes a first connection belt guide section 26a, a second connection belt guide section 26b, and a third connection belt guide section 26c, each of which is provided on both side portions of the load rolling-element rolling surface 23 and extends in the longitudinal direction. Further, the motion guide apparatus 1 according to the present embodiment has a structure in which the moving member 20 is not brought into contact with the roller-shaft-direction end surface of the drum-shaped roller 30. That is, the motion guide apparatus 1 has a structure in which no positioning device for regulating the roller-shaft-direction movement of the drum-shaped roller 30 is formed. It should be noted that a first seal device 27a for preventing intrusion of dust, and the like, onto the load rolling-element rolling surface 23 from the upper surface of the track member 10 is provided so as to be adjacent to the first connection belt guide section 26a. Further, a second seal device 27b for preventing intrusion of dust, and the like, onto the load rolling-element rolling surface 23 from the side surface of the track member 10 is provided at each of the lower ends of the third connection belt guide sections 26c.

As shown in FIG. 3, the cross-sectional shape of each of the rolling-element rolling surface 11 and the load rolling-element rolling surface 23 is formed to have a circular arc shape projecting toward either the load rolling-element rolling surface 23 or the rolling-element rolling surface 11 so as to correspond to the drum shape of the drum-shaped roller 30. Further, the rolling-element rolling surface 11 and the load rolling-element rolling surface 23, between which the drum-shaped rollers 30 are arranged, are formed to have an angular contact structure in which the initial contact angle is formed to be, for example, 45°. Specifically, the rolling-element rolling surface 11 and the load rolling-element rolling surface 23 are formed to have an angular contact structure provided with: a crossing point P2 at which contact angle lines L2 and L3 of the drum-shaped rollers 30, respectively rolling on a pair of the rolling-element rolling surfaces 11 provided on the lower side, that is, the base side, of the track member 10, cross each other above the track member 10 by being inclined upward, for example, at 45° with respect to a lower horizontal line H2 formed by connecting to each other the width-direction centers of the circular arc shapes of the rolling-element rolling surfaces 11; and a crossing point P1 at which contact angle lines L1 and L4 of the drum-shaped rollers 30, respectively rolling on a pair of the rolling-element rolling surfaces 11 provided on the upper side of the track member 10, cross each other at a lower portion of the track member 10 by being inclined downward, for example, at 45° with respect to an upper horizontal line H1 formed by connecting to each other the width-direction centers of the circular arc shapes of the rolling-element rolling surfaces 11. It should be noted that the contact angle line means a line formed by connecting to each other the points at which the rolling-element rolling surface 11 and the load rolling-element rolling surface 23 are brought into contact with each other via the drum-shaped roller 30.

It should be noted that each of the crossing point P1 and the crossing point P2 cross each other on a center line C extending in the direction vertical to the short side direction of the track member 10. The present embodiment has a vertically and horizontally symmetrical DF structure configured such that an action point Q1, at which the contact angle lines L1 and L2 cross each other, and an action point Q2, at which the contact angle lines L3 and L4 cross each other, are located inside the cross-section of the track member 10 so that loads are received equally in four directions. The motion guide apparatus 1 according to the present embodiment is configured to have the DF structure. Therefore, even when a preload is applied to the drum-shaped roller 30, the mounting error can be absorbed by the effect of the self-adjusting capability described below, and thereby a highly precise and smooth motion guide can be realized.

Further, the cross-sectional shape of the rolling-element rolling surface 11 and the load rolling-element rolling surface 23 can be formed into a shape having, for example, a single R (curvature) and R/(2f) which are substantially the same as those of the drum shape of the drum-shaped roller 30. Here, f represents a groove fitting degree and is expressed by a ratio of the curvature radius of each of the cross-section of the rolling-element rolling surface 11 and the load rolling-element rolling surface 23, with respect to the single R of the drum-shaped roller 30, and is set in a range of $0.50 < f \leq 0.55$. When the groove fitting degree f is set in this range, the contact structures of the drum-shaped roller 30, the rolling-element rolling surface 11 and the load rolling-element rolling surface 23 can also be configured as a circular arc contact structure. It should be noted that a rolling surface 34 of the rolling element, the rolling-element rolling surface 11, and the load rolling-element rolling surface 23 are each formed to have a circular arc shape having a single curvature, and hence can effectively exhibit the self-adjusting capability described below when receiving a load.

Next, there will be described the contact state of the rolling-element rolling surface 11 and the load rolling-element rolling surface 23 between which the drum-shaped rollers 30 are provided, at the time when the moving member 20 receives an excessive moment load MX as shown in FIG. 3. As shown in FIG. 4, when receiving the moment load MX, the moving member 20 is displaced in the horizontal direction, the vertical direction, and the Mx direction. According to this displacement of the moving member 20, a center C1 of the circular arc of the load rolling-element rolling surface 23 is moved by Δz and Δy in the vertical and horizontal directions so as to be shifted to C1'. At this time, the drum-shaped roller 30 is moved to a place located on a line formed by connecting the center of the circular arc of the rolling-element rolling surface 11, with the center C2 of the circular arc of the load rolling-element rolling surface 23. Therefore, the relative sliding amount between the width-direction center point A1 of the load rolling-element rolling surface 23, and the shaft-direction center point Rc of the drum-shaped roller 30 is smaller than the relative sliding amount between the width-direction center point A2 of the rolling-element rolling surface 11, and the shaft-direction center point Rc of the drum-shaped roller 30. Further, at the contact portion at which both the center point A1 and the center point Rc are brought closer to each other by a distance 8, the drum-shaped roller 30 is elastically deformed to be in contact with the load rolling-element rolling surface 23, and hence the contact structure is not changed before and after displacement of the moving member 20. This is because, in the case where the drum-shaped roller 30 is arranged so as to be sandwiched between the driving side (moving member 20) and the driven side (track member 10), when a moment centering around a point of a lower portion of the driven side is applied, the driving side located at the contact point of the drum-shaped roller 30 receives a force for making the driving side bite into the drum-shaped roller 30, and the driven side receives a force for making the driven side escape along the circular arc of the rolling-element rolling surface 11. Also, this is because the drum-shaped roller 30 is made to slide in the S direction by the force for making the drum-shaped roller 30 escape along the circular arc of the rolling-element rolling surface 11.

As described above, in the motion guide apparatus 1 according to the present embodiment, since the contact structure is not changed before and after displacement of the moving member 20 as described above, and since the drum-shaped roller 30 has the self-adjusting capability of following the moving member 20, the drum-shaped rollers 30 can be smoothly endlessly circulated without the positioning devices of the drum-shaped roller 30 being provided at the moving member 20.

Further, in this way, the contact structure is not changed before and after displacement of the moving member 20, and hence the drum-shaped roller 30 can perform autonomous positioning. That is, even when a moment load is applied to the moving member 20, to cause the moving member 20 to be displaced relatively to the drum-shaped roller 30, the drum-shaped rollers are circulated while following the moving member 20, and hence the drum-shaped rollers 30 can be endlessly circulated without the positioning devices being provided at the moving member 20.

Therefore, in the motion guide apparatus 1 according to the present embodiment, it is not necessary to provide the conventionally used positioning sections, such as walls and flanges, for regulating the position of each end portion of the cylindrical rollers, and hence it is possible to manufacture the motion guide apparatus 1 whose manufacturing cost is reduced.

Next, a motion guide apparatus using a barrel-shaped roller whose diameter is gradually increased from the shaft-direction both ends to the center of the roller will be described as a comparison example with reference to FIG. 5 and FIG. 6.

As shown in FIG. 5, the comparison example is a motion guide apparatus 100 including barrel-shaped rollers 130, and a track member 110 and a moving member 120 respectively provided with a rolling-element rolling surface and a load-rolling-element rolling surface, each of which is provided with a circular arc-shaped recessed section corresponding to the barrel-shaped roller. It should be noted that, similarly to the motion guide apparatus 1 according to the present embodiment, the comparison example is formed to have a DF structure in which two pairs of rolling-element rolling surfaces, that is, a total of four rolling-element rolling surfaces, are respectively provided on both side surfaces of the track member 110.

When the moment load MX is applied to the moving member 120 of the comparison example, the driven side located at the contact point of the barrel-shaped roller 130 receives, as shown in FIG. 6, a force for making the driven side bite into the track member 110, and the driving side is made to slide along the circular arc shape of the moving member 120. Thereby, the driving side moving member 120 is moved in the T direction, and the barrel-shaped roller 130 is relatively moved from the state shown by dotted lines to the state shown by solid lines so as to follow the track member 110. As described above, this is because a slide is caused between the width-direction center point A1' of the load rolling-element rolling surface 123, and the shaft-direction center point Rc' of the barrel-shaped roller 130, and almost no slide is caused between the width-direction center point A2' of the rolling-element rolling surface 111, and the shaft-direction center point Rc' of the barrel-shaped roller 130.

That is, when the barrel-shaped roller 130 is used, a structure is configured, in which the barrel-shaped rollers 130 are held by the rolling-element rolling surface 111 and the load rolling-element rolling surface 123. Therefore, the positioning of the barrel-shaped roller 130 in the shaft direction can be more easily performed as compared with the case of using the cylindrical roller, and flange sections do not need to be provided at the moving member similarly to the case of using the drum-shaped rollers. However, the barrel-shaped roller exhibits the self-adjusting capability of following the track member 110, and hence the roller-shaft-direction position of the barrel-shaped roller with respect to the moving member 120 is not fixed. At this time, when a moment load is applied to the moving member 120, the barrel-shaped roller 130 is moved to follow the track member 110, so that the position of the barrel-shaped roller 130 relative to the moving member 120 is changed. Thereby, when the barrel-shaped rollers 130 rolling on the load rolling-element rolling surface are scooped by a scooping section formed at the side lid, the scooping section interferes with the barrel-shaped rollers 130, so that the barrel-shaped rollers 130 cannot be smoothly endlessly circulated. For this reason, positioning devices are eventually needed.

It should be noted that the motion guide apparatus 1 according to the present embodiment is described in the case where the motion guide apparatus 1 is configured to have a DF structure, but the present invention is not limited to such case. For example, as shown in FIG. 7, in a motion guide apparatus configured to have an angular contact structure in which contact angle lines L1' and L4' of the drum-shaped rollers 30, rolling on upper rolling-element rolling surfaces, cross each other at a crossing point P1' located above a moving member 20a, and in which contact angle lines L2' and L3' of the drum-shaped rollers 30, rolling on lower rolling-element rolling surfaces, cross each other at a crossing point P2' located at a lower portion of the moving member 20a, a DB structure is configured such that an action point Q1' at which the contact angle lines L1' and L2' cross each other, and an action point Q2' at which the contact angle lines L3' and L4' cross each other are located outside the cross-section of a track member 10a. When the DB structure is configured in this way, it is possible to obtain a motion guide apparatus having high rigidity. Even in this modification, the contact structure of the moving member 20a and the roller 30 is not changed, and the self-adjusting capability is exhibited, so that the smooth endless circulation of the rollers can be realized.

Second Embodiment

In the motion guide apparatus 1 according to the first embodiment described above, there is described a case where a pair of rolling-element rolling surfaces are respectively formed on both side surfaces of each of upper and lower portions of the track member, so that a total of four rolling-element rolling surfaces are formed. As for a motion guide apparatus 2 according to a second embodiment described below, an example of the motion guide apparatus 2 different from the first embodiment is described. It should be noted that members similar to those in the case of the first embodiment described above are denoted by the same reference numerals, and the explanation thereof is omitted.

Figure 8:
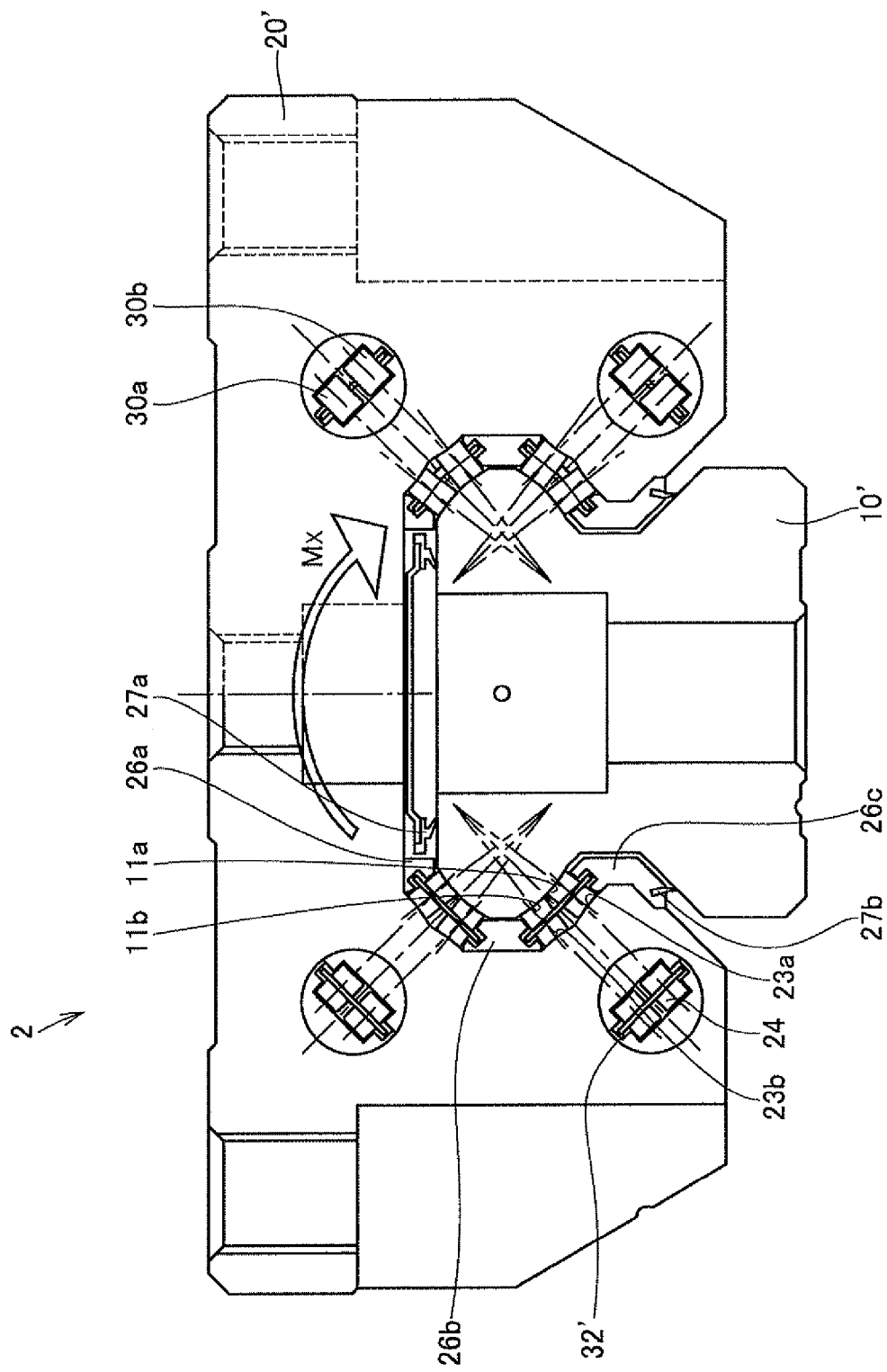
FIG. 8 is a cross-sectional view showing a motion guide apparatus according to a second embodiment of the present invention.

FIG. 8 is a cross-sectional view showing the motion guide apparatus 2 according to the second embodiment of the present invention. As shown in FIG. 8, the motion guide apparatus 2 according to the second embodiment is configured to have a structure in which a plurality of rows of drum-shaped rollers are arranged. Specifically, a track member 10' is provided with a first rolling-element rolling surface 11a and a second rolling-element rolling surface 11b. Each of drum-shaped rollers 30a and 30b is arranged so as to roll between each of the first rolling-element rolling surface 11a and the second rolling-element rolling surface 11b, and each of a first load rolling-element rolling surface 23a and a second load rolling-element rolling surface 23b which respectively face the first rolling-element rolling surfaces 11a and the second rolling-element rolling surface 11b. That is, in the motion guide apparatus 2 according to the present embodiment, the track member 10' is formed to have eight rolling-element rolling surfaces, and similarly, a moving member 20' is formed to have eight load rolling-element rolling surfaces.

Further, each of the drum-shaped rollers 30a and 30b is formed into a drum shape similarly to the motion guide apparatus 1 according to the first embodiment, and is formed to have a shape whose diameter is gradually reduced from shaft-direction both end portions along the shaft direction. Further, each of the first and second rolling-element rolling surfaces 11a and 11b is formed to have a circular arc shape projecting toward each of the first load rolling-element rolling groove 23a and the second load rolling-element rolling surface 23b, so as to correspond to the drum shape of the drum-shaped rollers 30a and 30b. Each of the first and second load rolling-element rolling surfaces 23a and 23b is formed to have a circular arc shape projecting toward each of the first and second rolling-element rolling surfaces 11a and 11b, so as to correspond to the drum shape of the drum-shaped rollers 30a and 30b. Further, each of the drum-shaped rollers 30a and 30b, which are made to roll on each of the first and second rolling-element rolling surfaces 11a and 11b that are formed on each of the left and right side surfaces, is formed to have an angular contact structure. Specifically, the motion guide apparatus 2 according to the present embodiment is formed to have a DF structure similarly to the motion guide apparatus 1 according to the first embodiment.

It should be noted that the drum-shaped rollers 30a and 30b are connected to each other by a connection belt 32' made of synthetic resin. In this way, the drum-shaped rollers 30a and 30b adjacent to each other are connected to each other by the synthetic resin. Therefore, when the drum-shaped rollers 30a and 30b are made to roll through the rolling-element return path 24 which is a no-load region, the drum-shaped rollers 30a and 30b are made to roll so that the shaft direction of the drum-shaped rollers 30a and 30b are directed in the same direction. When each of the drum-shaped rollers 30a and 30b is made to roll through the region between each of the first and second rolling-element rolling surfaces 11a and 11b, and each of the first and second load rolling-element rolling surfaces 23a and 23b, which region is a load region, the drum-shaped rollers 30a and 30b can be made to roll so that the shaft directions of the drum-shaped rollers 30a and 30b cross each other according to the shape of the first and second rolling-element rolling surfaces 11a and 11b.

Here, in the motion guide apparatus 2 according to the present embodiment, the initial contact angle of the drum-shaped roller 30a can be set to 37.5°, and the initial contact angle of the drum-shaped roller 30b can be set to 52.5°. It should be noted that, also in the motion guide apparatus 2 according to the present embodiment, the drum-shaped roller has the self-adjusting capability of following the moving member, and hence positioning devices for regulating shaft-direction movement of the drum-shaped rollers does not need to be provided at the moving member 20'.

In this way, since, in the motion guide apparatus 2 according to the present embodiment, a plurality of rows of the drum-shaped rollers are arranged with respect to the rolling-element rolling surfaces, a load applied to each rolling element can be reduced, and hence the rigidity of the entire motion guide apparatus can be improved.

Figure 9:
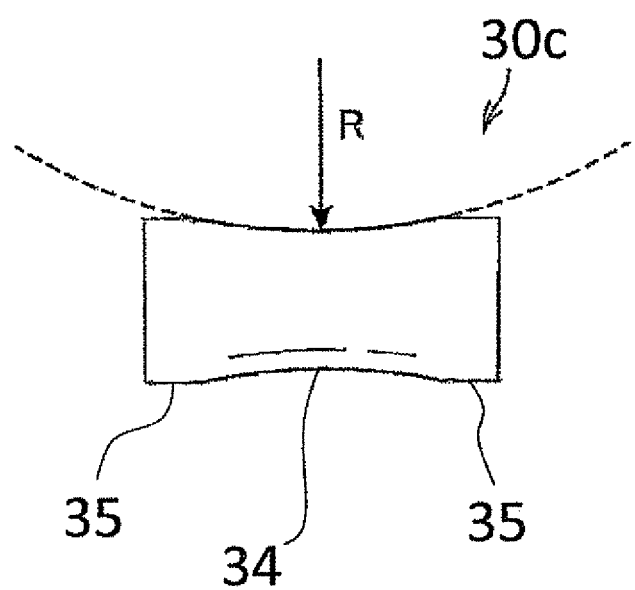
FIG. 9 is a front view for explaining a modification of the drum-shaped roller used for the motion guide apparatus according to the first embodiment of the present invention.

Further, in the motion guide apparatus 1 according to the first embodiment, as in a drum-shaped roller 30c shown in FIG. 9, the drum-shaped roller may be formed to have a flat surface 35 which is in parallel with the shaft direction and which is formed along the circumferential direction at each shaft-direction end of the drum-shaped roller. When the flat surfaces 35 are formed in this way, the flat surface 35 can be used as a reference surface for processing at the time of manufacture of the drum-shaped roller 30c, and hence it is possible to easily perform highly precise processing.

Further, each of the rolling-element rolling surface 11 and the load rolling-element rolling surface 23 is formed to have a curvature R the same as the curvature R of the rolling surface 34 of the drum-shaped roller 30c. Therefore, the flat surface 35 is not brought into contact with the rolling-element rolling surface 11 and the load rolling-element rolling surface 23, and hence when a load is applied to the rolling element, stress concentration is not caused at the connection portion of the curvature R and the flat surface 35. It should be noted that, as described above, the flat surface 35 is formed as a reference surface for processing, and hence it is preferred that the flat surface 35 is formed to have the shaft-direction width of, for example, about 0.3 to 0.5 mm.

It should be noted that the present invention is not limited to the above-described embodiments, and various modifications and changes can be made within the scope and spirit of the present invention. For example, although a case where the track member is formed to have a rectangular cross-section is described in the present embodiment, the shape of the track member is not limited to this and can be suitably changed according to required rigidity and processability. Further, although the case where a belt-shaped retainer is applied to each of the motion guide apparatuses 1 and 2 according to the present embodiments is described, the present invention is not limited to this, and each of the motion guide apparatuses 1 and 2 may be configured only by drum-shaped rollers without using the belt-shaped retainer, and a spacer can also be provided between the drum-shaped rollers adjacent to each other.

Even in the case where the motion guide apparatus is configured only by drum-shaped rollers, and where the drum-shaped rollers adjacent to each other are brought into contact with each other, when the drum-shaped roller 30c is formed to have the flat surface 35, the flat surfaces 35 are brought into contact with each other so as to prevent the rolling surfaces 34 from being damaged by contact with each other, and hence a long life of the drum-shaped rollers can be achieved.

Further, cases where four or eight rolling-element rolling surfaces are provided are described, but the number of the rolling-element rolling surfaces is not limited to this, the number of the rolling-element rolling surfaces can be suitably changed according to required rigidity and a required load. It is obvious from descriptions in the scope of claims that such changed or modified embodiment can also be included in the technical scope of the present invention.

REFERENCE NUMERALS 1, 1a, 2 Motion guide apparatus
10, 10' Track member
11 Rolling element rolling surface
11a First rolling-element rolling surface
11b Second rolling-element rolling surface
20, 20' Moving member
23 Load rolling-element rolling surface
23a First load rolling-element rolling surface
23b Second load rolling-element rolling surface
30, 30a, 30b, 30c Roller
35 Flat surface
L1, L2, L3, L4, L1', L2', L3', L4' Contact angle line

The invention claimed is:

1. A motion guide apparatus comprising:
   a track member comprising a rolling-element rolling surface formed along a longitudinal direction of the track member;
   a moving member comprising a load rolling-element rolling surface formed so as to face the rolling-element rolling surface; and a rolling element provided between the moving member and the track member, the moving member configured to be movably assembled to the track member, wherein:

a cross-sectional shape of each of the rolling-element rolling surface and the load rolling-element rolling surface has a circular arc shape projecting in the direction that the rolling-element rolling surface and the load rolling-element rolling surface face each other;

a cross-sectional shape of the rolling element has a drum-shaped cross-section with a diameter gradually reduced from both ends of the rolling element along the shaft direction of the rolling element so as to correspond to the cross-sectional shape of the rolling-element rolling surface and the load rolling-element rolling surface;

the rolling-element rolling surface and the load rolling-element rolling surface configure an angular contact structure via the rolling element, the rolling-element rolling surface comprises a first upper rolling-element rolling surface, a second upper rolling-element rolling surface, a first lower rolling-element rolling surface and a second lower rolling-element rolling surface, a contact angle line extending through each of the first and second upper rolling-element rolling surface cross each other at a first crossing point provided above one of the moving member and lower portion of the moving member, a contact angle line extending through each of the first and second lower rolling-member rolling surfaces cross each other at a second crossing point provided at another one of the moving member and a lower portion of the moving member, and a first action point at which the contact angle lines of the first upper rolling-element rolling surface and the first lower rolling-element rolling surface cross each other and a second action point at which the contact angle lines of the second upper rolling-element rolling surface and second lower rolling-element rolling surface cross each other are located either inside or outside the cross-section of a track member so that loads are received equally in four directions, and wherein a distance between the first upper rolling-element rolling surface and the first lower rolling-element rolling surface is shorter than a distance between the first upper rolling-element rolling surface and the second upper rolling-element rolling surface.

2. The motion guide apparatus according to claim 1, wherein:

a plurality of pairs of the rolling-element rolling surfaces and a plurality of pairs of the load rolling-element rolling surfaces are formed, each pair of the rolling surfaces and each pair of the load rolling-element rolling surfaces being arranged to sandwich therebetween a center line extending vertically to the short side direction of the track member;

contact angle lines, respectively formed by one of the pairs of the rolling-element rolling surfaces and one of the pairs of the load rolling-element rolling surfaces being respectively brought into contact with each other via the rolling elements, cross each other above the track member to form a first action point;

contact angle lines, respectively formed by the other of the pairs of the rolling-element rolling surfaces and the other of the pairs of the load rolling-element rolling surfaces being respectively brought into contact with each other, cross each other at a lower portion of the track member to form a second action point; and the first action point and the second action point cross each other on the center line.

3. The motion guide apparatus according to claim 1, wherein in the circular arc contact structure, each of the rolling-element rolling surface and the load rolling-element rolling surface has a groove fitting degree of 0.5 or more to 0.55 or less.

4. The motion guide apparatus according to claim 1, wherein the moving member does not include a positioning section for regulating shaft-direction movement of the rolling element.

5. The motion guide apparatus according to claim 1, wherein the rolling element is provided with a flat surface formed at least at one shaft-direction end portion of the rolling element and in the circumferential direction in parallel with the shaft direction of the rolling element.

6. The motion guide apparatus according to claim 1, wherein the cross-sectional shape of the rolling surface of the rolling element, the cross-sectional shape of the rolling-element rolling surface, and the cross-sectional shape of the load rolling-element rolling surface are each formed to have a single curvature.

7. The motion guide apparatus according to claim 1, wherein a plurality of rows of the rolling elements are arranged.

\* \* \* \* \*